United States Patent
Hertensen

(10) Patent No.: US 9,821,993 B2
(45) Date of Patent: Nov. 21, 2017

(54) DISPENSER PLATFORM APPARATUS AND METHOD

(71) Applicant: Paul Hertensen, Hernando, FL (US)

(72) Inventor: Paul Hertensen, Hernando, FL (US)

( * ) Notice: Subject to any disclaimer, the term of this patent is extended or adjusted under 35 U.S.C. 154(b) by 181 days.

(21) Appl. No.: 14/517,826

(22) Filed: Oct. 18, 2014

(65) Prior Publication Data

US 2015/0034674 A1     Feb. 5, 2015

Related U.S. Application Data

(60) Provisional application No. 61/963,824, filed on Dec. 16, 2013, provisional application No. 61/996,436, filed on May 7, 2014.

(51) Int. Cl.
  *B67D 1/00* (2006.01)
  *B67D 1/08* (2006.01)
  *B67D 1/04* (2006.01)

(52) U.S. Cl.
  CPC ......... *B67D 1/0034* (2013.01); *B67D 1/0016* (2013.01); *B67D 1/0021* (2013.01); *B67D 1/0462* (2013.01); *B67D 1/0857* (2013.01); *B67D 1/0895* (2013.01); *B67D 1/0057* (2013.01)

(58) Field of Classification Search
  CPC .. B67D 1/0034; B67D 1/0058; B67D 1/0895; B67D 1/0857; B67D 1/0021; B67D 1/0888; B67D 1/0462; B65D 83/62
  USPC ...... 222/129.1, 146.1–146.5, 105, 95, 146.6, 222/129–145.8, 132; 426/596
  See application file for complete search history.

(56) References Cited

U.S. PATENT DOCUMENTS

| | | | | |
|---|---|---|---|---|
| 4,518,105 A | * | 5/1985 | Kuckens | G01F 11/082 222/207 |
| 4,901,886 A | * | 2/1990 | Kirschner | B67D 1/1234 222/1 |
| 5,064,097 A | * | 11/1991 | Brog | B01D 61/08 222/129 |
| 5,082,143 A | | 1/1992 | Schramm, Jr. | |
| 5,305,923 A | * | 4/1994 | Kirschner | B67D 1/0021 222/129.1 |
| 5,405,054 A | * | 4/1995 | Thomas | A23G 3/28 222/105 |
| 5,492,249 A | * | 2/1996 | Beach | A23G 9/283 222/105 |
| 5,556,006 A | * | 9/1996 | Sano | B67D 1/0022 222/129.1 |

(Continued)

*Primary Examiner* — Charles P Cheyney

(57) ABSTRACT

A dispenser platform for receiving a product container, having a casing, wholly or partially encasing a control panel coupled a control module and a product container receptacle having a product container coupling assembly. The product container coupling assembly includes a first product supply conduit configured to receive a barrel of a product container. A second product supply conduit couples to a reservoir or to a supply of a second product, such as water. The product container holds a first product, such as concentrated coffee, concentrated tea, concentrated flavored drink, flavored syrup (cola) or concentrated juice. Components of the dispenser platform include a pump assembly, a heating and/or cooling assembly responsively coupled to a control panel via a control module and a filter assembly. The product container can be a BOV container or an airless dispensing container.

7 Claims, 3 Drawing Sheets

(56) References Cited

U.S. PATENT DOCUMENTS

| | | | | |
|---|---|---|---|---|
| 5,797,519 A | * | 8/1998 | Schroeder | B67D 1/0032 222/129.1 |
| 6,644,508 B2 | * | 11/2003 | Haskayne | B67D 1/0057 222/1 |
| 6,824,017 B2 | * | 11/2004 | Sluijter | B67D 1/0831 222/105 |
| 6,896,159 B2 | * | 5/2005 | Crisp, III | B67D 1/0057 222/129.1 |
| 7,188,751 B2 | * | 3/2007 | Van Der Klaauw | B67D 1/0412 222/105 |
| 7,328,815 B2 | * | 2/2008 | Lowe | A47J 31/401 222/1 |
| 7,594,525 B2 | * | 9/2009 | Girard | A47J 31/407 141/351 |
| 2007/0029005 A1 | * | 2/2007 | Huang | B67D 1/0036 141/288 |
| 2008/0314475 A1 | * | 12/2008 | Fransen | B65D 83/62 141/20 |
| 2009/0108021 A1 | | 4/2009 | Hansen et al. | |
| 2009/0145924 A1 | * | 6/2009 | Fiedler | B67D 7/0255 222/95 |
| 2010/0116842 A1 | | 5/2010 | Hecht | |
| 2014/0190991 A1 | * | 7/2014 | Yang | B67D 1/0862 222/105 |

* cited by examiner

DISPENSER PLATFORM APPARATUS AND METHOD

CROSS REFERENCE TO RELATED APPLICATION

This application claims priority to U.S. Provisional Patent Application Ser. No. 61/963,824, filed Dec. 16, 2013, entitled DISPENSER PLATFORM AND BAG-ON-VALVE CONTAINER APPARATUS AND METHOD and Ser. No. 61/996,436 dated May 7, 2014 entitled DISPENSER PLATFORM APPARATUS AND METHOD.

FIELD OF THE INVENTION

The present invention relates to apparatus and methods for dispensing products from a product container, including a bag-on-valve (BOV) container or an airless dispensing system, such as, but not limited to, a collapsible bag-in-bottle container or a follower piston container.

BACKGROUND

Bag-on-Valve (BOV) is a packaging technology that is used for pharmaceutical, over the counter, food and healthcare products. A conventional BOV system consists of a rolled-up multi-layered flexible pouch attached to an aerosol valve. In the production of a BOV container with product, compressed air or nitrogen is injected into an empty canister, and a cup having an aerosol valve assembly with the BOV bag attached, is crimped onto the container. The product to be dispensed is forced through the aerosol valve stem to fill the BOV bag. Finally, the actuator and cap are put in place.

An airless dispensing system includes, inter alia, an airless piston package or aluminum pouch airless package. An airless dispenser system includes a pump assembly includes a pump mechanism with an inlet valve that is configured to efficiently pump viscous fluids and that is able to be pre-primed when the pump mechanism is attached to a container. In one form, the inlet valve includes a seal member that seals an inlet port of the pump and an outer support member that secures the inlet valve to the rest of the pump mechanism. Two or more legs generally extend in a circumferential direction between the support member and the seal member in order to create a large flow opening for fluid flow through the inlet valve when opened and to rapidly close the inlet valve. The pump mechanism further includes an outlet valve that is configured to draw fluid back from a nozzle of the pump after dispensing in order to minimize build up around the nozzle.

Conventional airless type pumps are advantageous as some food products deteriorate when placed in contact with air, thus it is important to prevent air from entering the package when dispensing the product. In typical dispensing pump applications, air is allowed to enter the container via a venting path in order to equalize the pressure inside the pack as product is dispensed. Were this not the case, the container would progressively collapse or, in the case of rigid containers, the increasing vacuum in the container would exceed the ability of the dispensing pump to draw product out of the container.

In airless type dispensing systems, there are two common ways to evacuate the container holding the product, either by using a follower piston type design or a collapsible bag type design. In the follower piston type design, a rigid container, usually cylindrical or oval in form, has a follower piston that progressively reduces the container volume as product is drawn out by the dispensing pump. With the collapsible type design, a collapsing bag is attached to the dispensing pump, which progressively collapses as the contents are removed.

What is desired is a dispenser to which a filled BOV container or an airless type dispensing container can be interchangeably coupled, the dispenser having a mixing valve or chamber for mixing product from the product container with a product such as water, or alternatively, a bypass conduit for bypassing the mixing valve or chamber so as to allow only product from the BOV container or an airless type dispensing container to be dispensed from the dispenser.

SUMMARY

A dispenser platform for receiving a bag on valve (BOV) container or an airless type dispensing container ("product container" hereinafter referring to either of the foregoing), having a casing, wholly or partially encasing a control panel coupled a control module and a product container receptacle having a product container coupling assembly. The product container coupling assembly includes a first product supply conduit configured to receive a barrel of a product container. A second product supply conduit couples to a reservoir or to a supply of a second product, such as water, which may be carbonated or processed with carbon. The product container holds a first product, such as concentrated coffee, concentrated tea, concentrated flavored drink, flavored syrup (e.g., cola) or concentrated juice, etc. A pump assembly having a pump inlet and pump outlet and a pump activation assembly is coupled to the control module and interposed between the second product supply conduit and a mixing chamber. In the mixing chamber, the first product and second product are combined. The first product and second product are introduced into the mixing chamber via one or more valve assemblies. A heating and/or cooling assembly responsively coupled to the control panel via the control module is configured and controlled to heat or cool the first product, second product or both of them, either prior to or after the mixing chamber. The product is then dispensed at a dispensing valve.

In an alternative embodiment, a carbonator comprising a carbon dioxide (CO2) tank is coupled to a conduit in direct or indirect communication with the second product supply conduit, which is water in this embodiment. The carbonator carbonates the water. The carbonated water (mixed CO2 and first product) can be introduced with flavored syrup at the dispensing valve (post-mix) or prior thereto, e.g., at the mixing chamber (pre-mix).

A filter assembly is interposed to filter the first product, second product of the combined products. The combined first product and second product are dispensed from the dispenser platform via a dispenser platform outlet. In a further embodiment, a bypass conduit is provided for bypassing the mixing valve or chamber so as to allow only product from the product container to be dispensed from the dispenser.

Although the preferred invention is described as being configured to receive, combine and dispense two products, the dispenser platform can be configured to receive, combine and dispense any desired number of products as long as one of the products is dispensed from either a bag on valve (BOV) container or an airless type dispensing container. Further, subcomponents of the dispenser platform component of the invention, such as the valve assemblies, filter assemblies, heating/cooling assemblies and pump assemblies can be arranged or configured in any desired serial, mesh or parallel arrangement as desired, and all such embodiments and arrangements are claimed by, and considered within the scope of this invention.

THE DRAWINGS

Other features of the invention will become clear from the following description, taken together with the accompanying drawings wherein.

DESCRIPTION OF THE INVENTION

The invention comprises a dispenser platform for receiving a bag on valve (BOV) container or an airless type dispensing container ("product container" hereinafter referring to either one of the foregoing), having a casing, wholly or partially encasing a control panel coupled a control module and a product container receptacle having a product container coupling assembly. The product container coupling assembly includes a first product supply conduit configured to receive a barrel of a product container. A second product supply conduit couples to a reservoir or to a supply of a second product, such as water. The product container holds a first product, such as concentrated coffee, concentrated tea, concentrated flavored drink, flavored syrup (e.g., cola) or concentrated juice, etc. A pump assembly having a pump inlet and pump outlet and a pump activation assembly is coupled to the control module and interposed between the second product supply conduit and a mixing chamber. In the mixing chamber, the first product and second product are combined. The first product and second product are introduced into the mixing chamber via one or more valve assemblies. A heating and/or cooling assembly responsively coupled to control panel via the control module is configured and controlled to heat or cool the first product, second product or both of them, either prior to or after the mixing chamber.

In an alternative embodiment, a carbonator comprising a carbon dioxide (CO2) tank is coupled to a conduit in direct or indirect communication with the second product supply conduit, which is water in this embodiment. The carbonator carbonates the water. The carbonated water (mixed CO2 and first product) can be introduced with flavored syrup at the dispensing valve (post-mix) or prior thereto, e.g., at the mixing chamber (pre-mix).

A filter assembly is interposed to filter the first product, second product of the combined products. The combined first product and second product are dispensed from the dispenser platform via a dispenser platform outlet or dispensing valve. In a further embodiment, a bypass conduit is provided for bypassing the mixing chamber so as to allow only the first product from the product container to be dispensed from the dispenser platform outlet, as controlled by the control module via the control panel.

Figure 1:
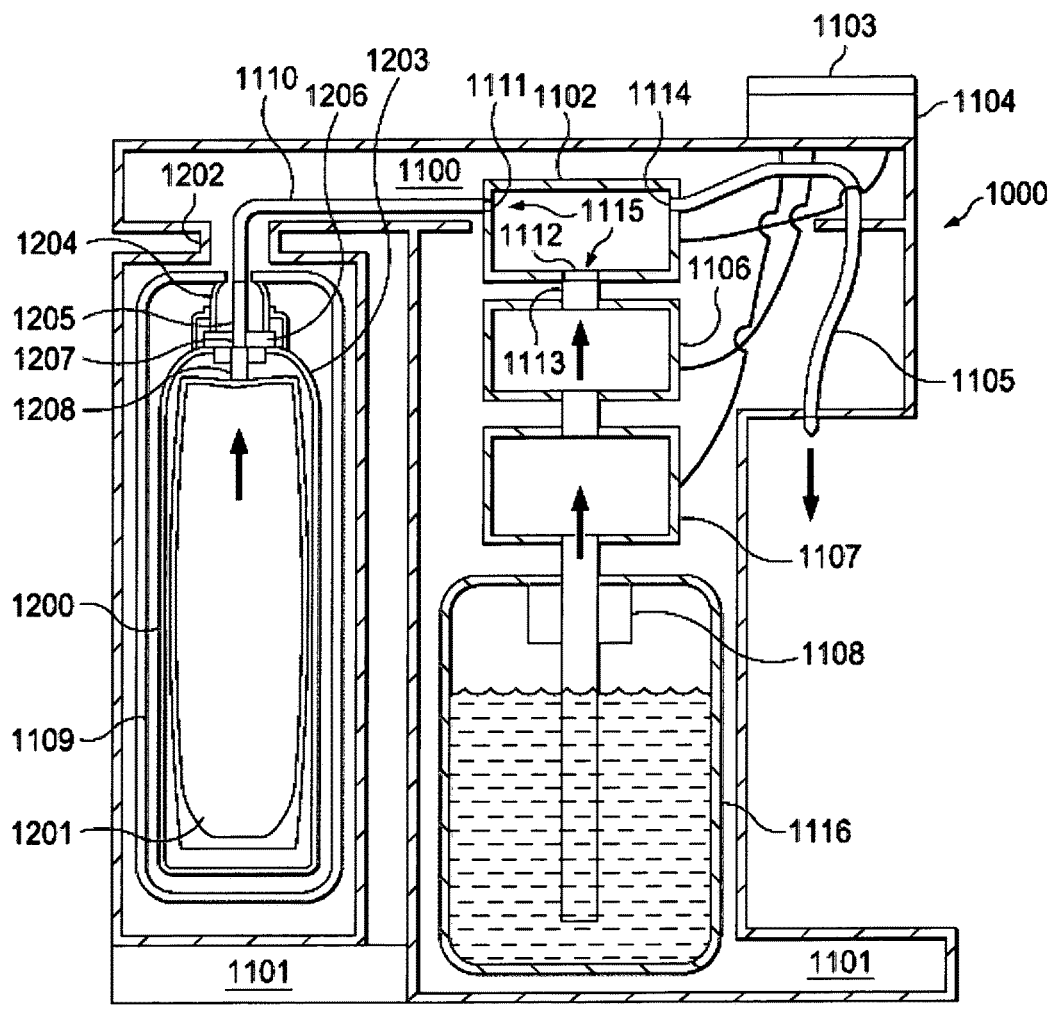
FIG. 1 is a block diagram of a first embodiment of the invention.
Figure 2:
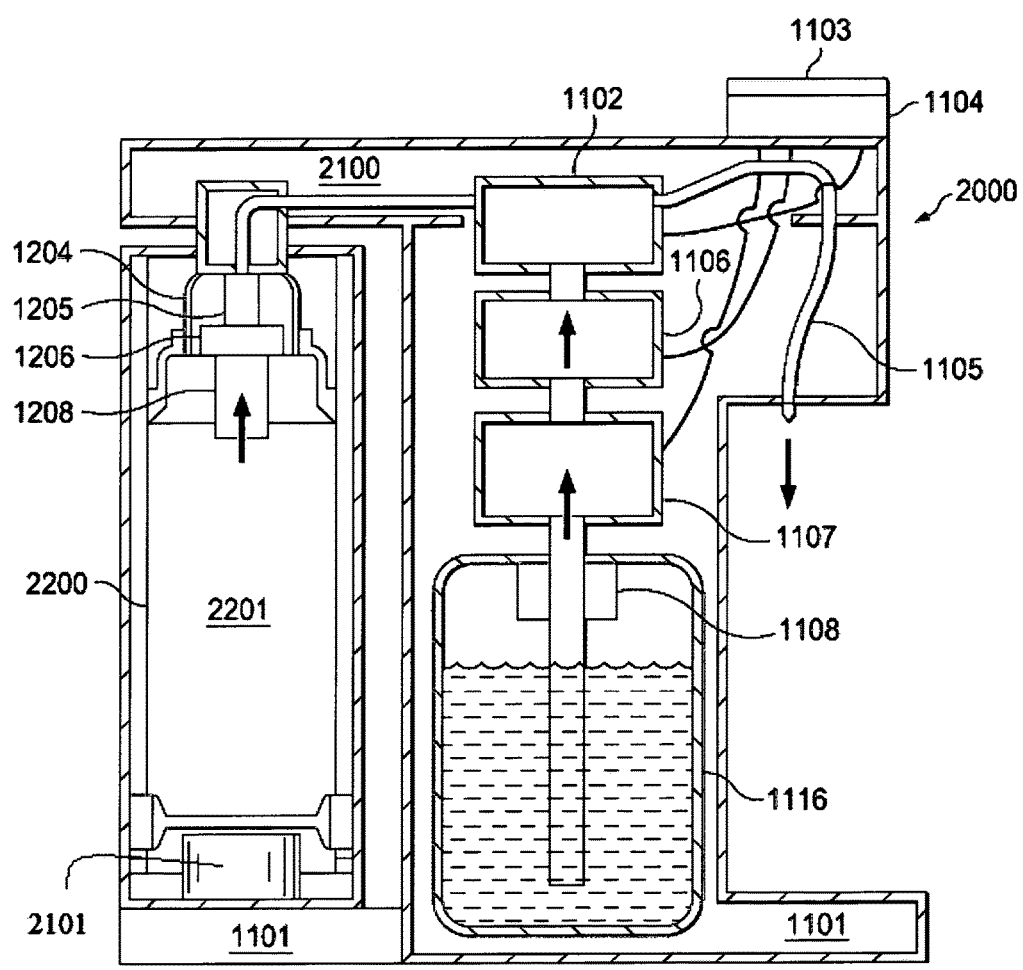
FIG. 2 is a block diagram of a second embodiment of the invention.
Figure 3:
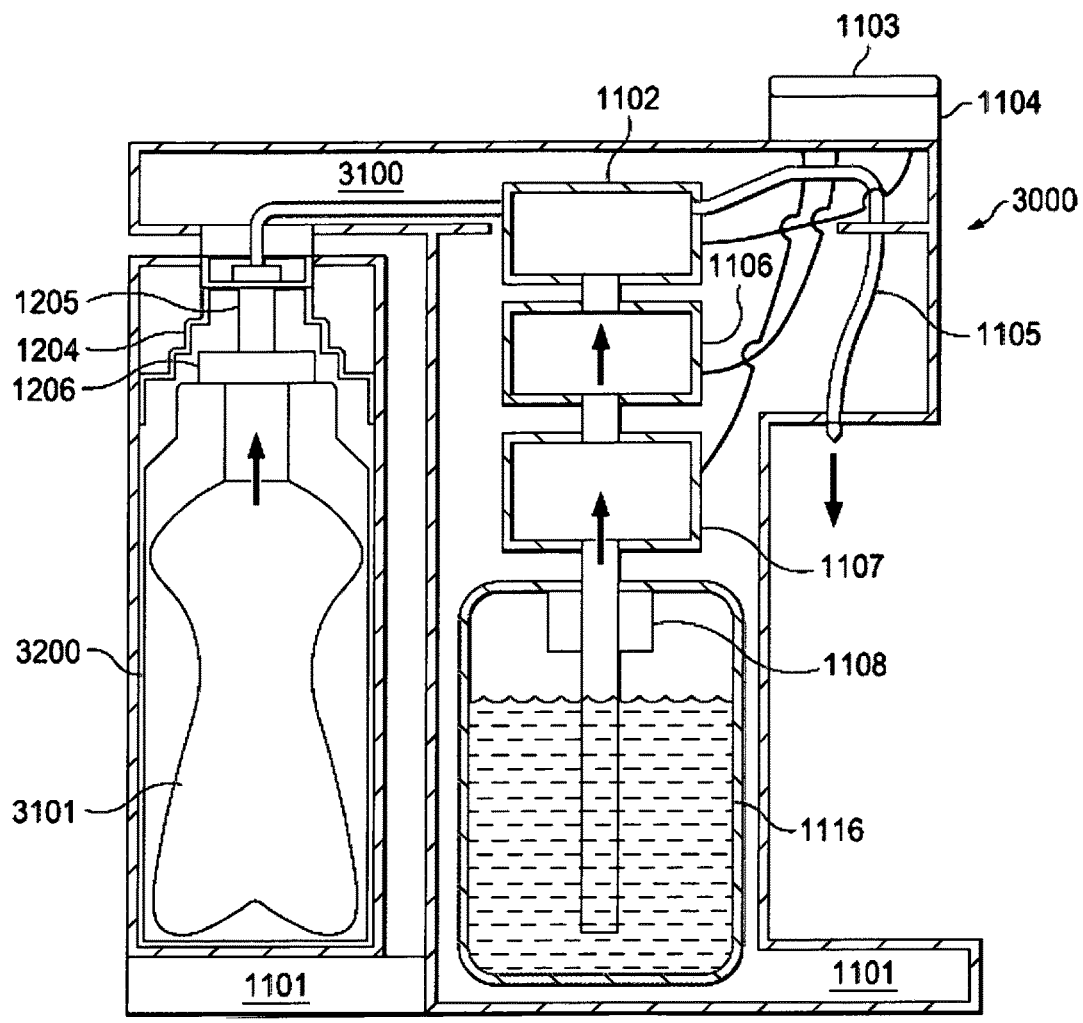
FIG. 3 is a block diagram of a third embodiment of the invention.

More specifically, as seen in FIG. 1, the invention 1000 generally comprises a dispenser platform 1100 and a product container 1200. As seen in FIGS. 2 and 3, the invention comprises dispenser platform 2100 and product container 2200, and dispenser platform 3100 and product container 3200, respectively. The invention 1000 is configured to dispense a combined an at least first product and second product. The first product, such as a concentrated coffee, concentrated tea, concentrated flavored drink, or concentrated juice, etc., is inside a bag in a product container 1200 having a barrel configured to be received by the dispenser platform 1100. The invention 2000 is configured to dispense a combined an at least first product and second product. The first product, such as a concentrated coffee, concentrated tea, concentrated flavored drink, or concentrated juice, etc., is inside product container 2200 having a barrel configured to be received by the dispenser platform 1100. The second product is, for example, water or steam.

The product container 1200 is comprised of a canister 1203, a cup 1204 proximate the top of the canister 1203 and a barrel 1205 flexibly coupled to the cup 1204, the cup 1204 rigidly coupled to the canister 1203. A valve assembly 1206 has an outlet 1207, the outlet 1207 being directly or indirectly coupled to and in communication with the barrel 1205 and a valve assembly inlet 1208. The following description describes the BOV container embodiment, but as seen in FIGS. 2 and 3, the invention also encompasses an airless dispensing container embodiment.

A chamber 1201 within the canister is a substantially impervious product bag or container. In the BOV container embodiment, the BOV bag 1201 has a BOV bag outlet 1202 in communication with the interior of the BOV bag; and a conduit forming a pathway from the bag outlet, and hence the interior of the bag, to the valve assembly inlet. A propellant is included inside the canister and substantially surrounding the exterior of the BOV bag which exerts a pressure on the exterior of the BOV bag, causing the first product to be expelled through the barrel. In FIG. 2, invention 2000 is shown with an airless piston 2101 for compressing a fluid in a piston airless container and in FIG. 3, invention 3000 is shown with an aluminum pouch airless container. As seen in FIG. 2, the airless piston 2101 is positioned proximate a moveable closed bottom of the piston airless dispenser product container 2201 and configured to push the first product in an upward direction with respect to the base of the platform 2000.

The product container 1200 is configured to be inserted in the dispenser platform 1100. The dispenser platform 1100 includes a casing, wholly or partially encasing several components. These components include a product container receptacle 1101 having a product container coupling assembly 1109, the product container coupling assembly 1109 further comprising a first product supply conduit 1110 configured to receive and release a barrel of a product container. In other embodiments, the product container coupling assembly 1109 is configured receive and release product containers using modular components that may be standardized and form a seal between the product container 1200 and the product container coupling assembly 1109. Additional components include a second product supply conduit 1113 and a mixing chamber 1102. The mixing chamber 1102 further comprises a first inlet 1111 having a first valve in communication with the first product supply conduit 1110 for metering the first product and a second inlet 1112 having a second valve in communication with the second product supply conduit 1113 for metering the second product, and a mixing chamber outlet 1114. A mixing chamber control assembly 1115 is coupled to the first inlet, second inlet or first inlet and second inlet, for metering the amount of first product, second product, or first product and second product into the mixing chamber 1102. The invention 3000 is configured to dispense a combined an at least first product and second product. The first product, such as a concentrated coffee, concentrated tea, concentrated flavored drink, or concentrated juice, etc., is inside product container 3200 having a barrel configured to be received by the dispenser platform 3100.

The second product is, for example, water or steam. Referring back to FIG. 1, the product container 1200 is comprised of a canister, a cup proximate the top of the canister and a barrel flexibly coupled to the cup, the cup rigidly coupled to the canister. A valve assembly has an outlet, the outlet being directly or indirectly coupled to and in communication with the barrel and a valve assembly inlet. The following description describes the BOV container embodiment, but as seen in FIGS. 2 and 3, the invention 2000, 3000 also encompasses an airless dispensing container embodiment.

A chamber 1201 within the canister is a substantially impervious product bag or container. In the BOV container embodiment, the BOV bag 1201 has a BOV bag outlet 1202 in communication with the interior of the BOV bag; and a conduit forming a pathway from the bag outlet, and hence the interior of the bag, to the valve assembly inlet. A propellant is included inside the canister and substantially surrounding the exterior of the BOV bag which exerts a pressure on the exterior of the BOV bag, causing the first product to be expelled through the barrel. In FIG. 2, invention 2000 is shown with a piston airless container 2201 and in FIG. 3, invention 3000 is shown with an aluminum pouch airless container 3101.

The product container 1200, 2200, 3200, as the case may be, is configured to be inserted in the dispenser platform 1100, 2200, 3200, respectively. The dispenser platform 1100, 2200, 3200, as the case may be, includes a casing, wholly or partially encasing several components. As seen in FIGS. 1, 2 and 3, these components include a product container receptacle 1101 having a product container coupling assembly, the product container coupling assembly further comprising a first product supply conduit configured to receive and release a barrel of a product container. In other embodiments, the product container coupling assembly is configured receive and release product containers using modular components that may be standardized and form a seal between the product container and the product container coupling assembly. Additional components include a second product supply conduit and a mixing chamber. The mixing chamber 1102 further comprises a first inlet having a first valve in communication with the first product supply conduit for metering the first product and a second inlet having a second valve in communication with the second product supply conduit for metering the second product, and a mixing chamber outlet. A mixing chamber control assembly is coupled to the first inlet, second inlet or first inlet and second inlet, for metering the amount of first product, second product, or first product and second product into the mixing chamber 1102.

In a further embodiment, a bypass conduit is provided for bypassing the mixing chamber 1102 so as to allow only first product from the product container to be dispensed from the dispenser platform outlet. A control panel 1103 is coupled to a control module 1104 and to the mixing chamber control assembly so as to allow user input to control the amount of the first product, second product or first product and second product into the mixing chamber 1102. A dispenser platform outlet or dispensing valve 1105 is integrated with or coupled to the mixing chamber outlet.

Further components include a pump assembly 1106 interposed between the second product supply conduit and the mixing chamber second inlet, the pump assembly 1106 having a pump inlet and pump outlet and a pump activation assembly coupled to the control module 1104.

A further component is a coupler for directly coupling the second product supply conduit 1113 to a source of second product, the coupler being coupled to the mixing chamber inlet of the dispenser platform 1100. The coupler couples the second product supply conduit 1113 of a source of water or to a reservoir 1116 having a reservoir fill aperture and a reservoir outlet for connection to the second product supply conduit 1113. The reservoir 1116 can be fabricated to hold water as the second product.

A further component is a heating assembly or/and a cooling assembly 1107. The heating assembly and/or cooling assembly can be responsively coupled to the control panel 1103 via the control module 1104. The heating assembly and/or cooling assembly 1107 can be interposed between the first product supply conduit and the first inlet to the mixing chamber 1102 for heating or cooling, respectively, the first product prior to its introduction into the mixing chamber 1102. Similarly, the heating assembly or/and cooling assembly 1107 can be interposed between the second product supply conduit and the second inlet to the mixing chamber 1102 for heating or cooling, respectively, the second product prior to its introduction into the mixing chamber 1102. Alternatively or in addition, the heating assembly and/or cooling assembly 1107 can be interposed between the mixing chamber outlet and the dispenser platform outlet or dispensing valve for heating or cooling, respectively, the combined first product and second product prior to its exit from the dispenser platform outlet.

In an alternative embodiment, a carbonator (not shown) comprising a carbon dioxide ($CO_2$) tank is coupled to a conduit in communication with the second product, which is water in this embodiment. The carbonator carbonates the water. The carbonated water can be introduced with flavored syrup at the dispensing valve (post-mix) or prior thereto, e.g., at the mixing chamber (pre-mix).

A further component is a filter assembly 1108. The filter assembly 1108 can be interposed between the first product supply conduit and the first inlet to the mixing chamber 1102 for filtering the first product prior to its introduction into the mixing chamber 1102 and/or interposed between the second product supply conduit and the second inlet to the mixing chamber 1102 for filtering the second product prior to its introduction into the mixing chamber 1102. Alternatively, or in addition, the filter assembly 1108 can be interposed between the mixing chamber outlet and the dispenser platform outlet or dispensing valve for filtering the combined first product and second product prior to its exit from the dispenser platform outlet.

In certain embodiments, the mixing chamber control assembly is coupled to the first valve, the second valve or the first valve and second valve. Further, in certain embodiments, the control module further comprises a microprocessor and firmware and is coupled to the mixing chamber control assembly and the control panel. In certain embodiments, a bypass conduit is provided for bypassing the mixing chamber via the mixing chamber control assembly so as to allow only first product from the product container to be dispensed from the dispenser platform outlet.

The dispenser platform 1100 further includes a drip tray for holding a container, such as a cup, for receiving the combined first product and second product dispensed from the dispenser platform outlet or dispensing valve.

In certain further embodiments, the pump assembly has a pump inlet and pump outlet and a pump activation assembly coupled to the control module.

In certain further embodiments, the control panel 1103 includes an on/off switch and a switch/lever/dial for controlling, via the control module 1104, the amount of first product into the mixing chamber, the amount of second product into the mixing chamber or the amount of the first product and second product into the mixing chamber or the level of carbonation introduced into the second product.

In certain further embodiments, the control panel 1103 further includes a switch/lever/dial for controlling, via the control module, the heating assembly and/or cooling assembly for heating or cooling, respectively, the first product, the second product or the first product and second product.

In certain further embodiments, the control panel 1103 includes a filter indicator, the filter indicator coupled to the filter assembly and control module to indicate when a filter needs to be replaced or cleaned.

In an embodiment, the invention comprises a dispenser platform, comprising a casing, wholly or partially encasing the following components; a control panel coupled a control module and a product container receptacle having a product container coupling assembly. The product container coupling assembly further comprises a first product supply conduit configured to receive a barrel of a product container, a second product supply conduit, a pump assembly having a pump inlet and pump outlet and a pump activation assembly coupled to the control module, a heating or cooling assembly responsively coupled to the control panel via the control module, a filter assembly, and a mixing chamber. The mixing chamber further comprises a first inlet having a first valve in communication with the first product supply conduit for metering the first product and a second inlet having a second valve in communication with the second product supply conduit for metering the second product and a mixing chamber outlet. A mixing chamber control assembly is coupled to the first inlet, second inlet or first inlet and second inlet, for metering the amount of first product, second product, or first product and second product into the mixing chamber. A dispenser platform outlet or dispensing valve is integrated with or coupled to the mixing chamber outlet and a drip tray is provided for holding a container, such as a cup, for receiving the combined first product and second product dispensed from the dispenser platform outlet or dispensing valve. A coupler directly couples the second product supply conduit to a source of second product, the coupler being coupled to the mixing chamber inlet of the dispenser platform or alternatively, a reservoir having a reservoir fill aperture and a reservoir outlet for connection to the second product supply conduit is provided. A coupler to a direct source of the second product, such as water, can be coupled to the reservoir fill aperture. The mixing chamber control assembly is coupled to the control module and the first valve, the second valve or the first valve and second valve. The control module further can further comprise a microprocessor and firmware. The invention further comprises a dispenser platform in combination with a product container, being either a bag-on-valve container or an airless dispensing container. The invention further comprises a carbonator for introducing carbonation into the second product.

Figure 4:
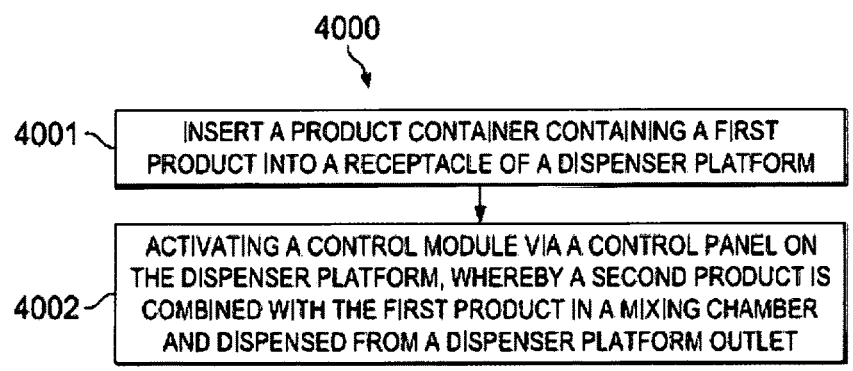
FIG. 4 is a flow chart of the method of the invention.

Referring to FIG. 4, the invention further comprises a method 4000 of dispensing a combination of a first product and a second product, comprising the steps of inserting 4001 a product container containing a first product into a receptacle of a dispenser platform; and activating 4002 a control module via a control panel on the dispenser platform, whereby a second product is combined with the first product in a mixing chamber and dispensed from a dispenser platform outlet. In such method, the first product is selected from the group consisting of concentrated coffee, concentrated tea, concentrated flavored drink, flavored syrup (e.g., cola) or concentrated juice, etc. and the second product is water.

While the present invention has been described by reference to certain embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. An apparatus for dispensing a combined first product and second product, comprising:
 a dispenser platform configured for receiving a product container, wherein the product container consists of a bag on valve (BOV) bag disposed within a canister, the canister being sealed with a propellant included within the canister and substantially surrounding the exterior of the BOV bag, wherein the product container is injected with a propellant prior to being received on the dispenser platform;
 the dispenser platform further comprising a casing, wholly or partially encasing the following components:
  a product container receptacle having a product container coupling assembly;
  the product container coupling assembly further comprising a first product supply conduit configured to receive a barrel of the product container; a second product supply conduit;
  a control panel coupled a control module, the control module coupled to a control assembly allowing for user input to meter the relative amounts of the first product and second product to be dispensed; and
  a mixing chamber for combining the first product and the second product and a dispenser platform outlet coupled to the mixing chamber;
  wherein the dispenser platform outlet dispenses the combined metered amounts of the first product and second product received from the mixing chamber;
 the product container further comprising:
  the canister;
  a BOV bag within the canister; a cup proximate the top of the canister;
  the barrel coupled to the cup, the cup rigidly coupled to the canister; a valve assembly within the cup having a valve assembly inlet; a BOV bag outlet in communication with an interior of the BOV bag; and forming a pathway from the interior of the BOV bag through the BOV bag outlet to the valve assembly inlet.

2. The apparatus of claim 1, wherein the first product is concentrated coffee.

3. The apparatus of claim 1, wherein the first product is selected from the group consisting of concentrated coffee, concentrated tea, concentrated flavored drink, flavored syrup (cola) and concentrated juice.

4. The apparatus of claim 1, wherein the first product is concentrated tea.

5. The apparatus of claim 1, wherein the dispenser platform further comprises:
 the mixing chamber further comprising a first inlet in communication with the first product supply conduit a second inlet in communication with the second product supply conduit and a mixing chamber outlet;

a mixing chamber control assembly configured for metering the amount of first product and second product, into the mixing chamber;

the control panel coupled to a control module, the control module coupled to the mixing chamber control assembly allowing for user input to control the amount of the first product, second product or first product and second product into the mixing chamber.

6. The apparatus of claim 5, further comprising a reservoir coupled to the second product supply conduit.

7. The apparatus of claim 1 wherein the second product is water.

\* \* \* \* \*